US005499292A

United States Patent [19]
Blonder et al.

[11] Patent Number: 5,499,292
[45] Date of Patent: Mar. 12, 1996

[54] ON HOOK/OFF HOOK MECHANISM FOR WRIST TELEPHONE

[75] Inventors: Greg E. Blonder, Summit; Bertrand H. Johnson, Murray Hill; George Knoedl, Jr., Milford, all of N.J.

[73] Assignee: AT&T Corp., Murray Hill, N.J.

[21] Appl. No.: 240,061

[22] Filed: May 6, 1994

[51] Int. Cl.⁶ .................................................. H04M 1/00
[52] U.S. Cl. ........................... 379/433; 379/428; 368/13
[58] Field of Search ...................................... 379/430, 433, 379/428, 434, 90; 368/10, 13, 277, 281, 282, 278

[56] References Cited

U.S. PATENT DOCUMENTS 4,847,818  7/1989  Olsen ....................................... 379/428
5,128,994  7/1992  Hattori et al. ........................... 379/433
5,218,572  6/1993  Seager ..................................... 379/430
5,239,521  8/1993  Blonder ..................................... 368/10
5,404,582  4/1995  Demuro et al. ........................... 455/90

*Primary Examiner*—Jeffery Hofsass
*Assistant Examiner*—Jack Chiang
*Attorney, Agent, or Firm*—Michele L. Conover

[57] ABSTRACT

A radiotelephone wrist device includes a case having a transceiver and a strap attached to the case for fastening the device to a user's wrist. The strap has a top layer and a bottom layer in which the top layer is releasable from the bottom layer of the strap. A microphone is located on the strap and electrically connected to the transceiver. A speaker is located at an end of the top layer of the strap and electrically connected to the transceiver. A cradle for receiving the speaker is formed in the case. A sensor located beneath the cradle detects when the speaker is removed from the cradle.

13 Claims, 5 Drawing Sheets

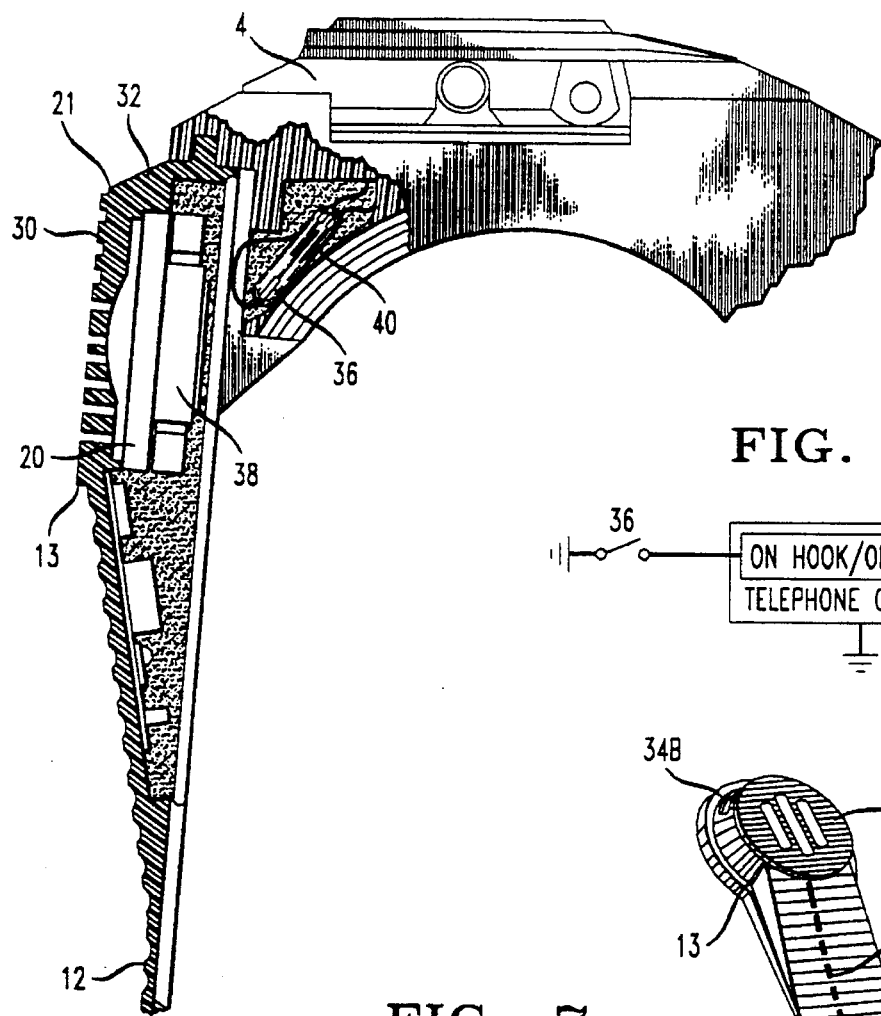
FIG. 5
FIG. 6
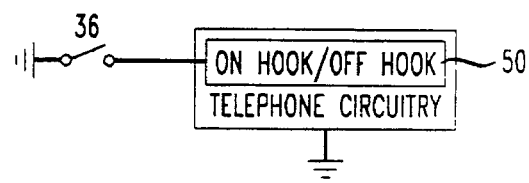
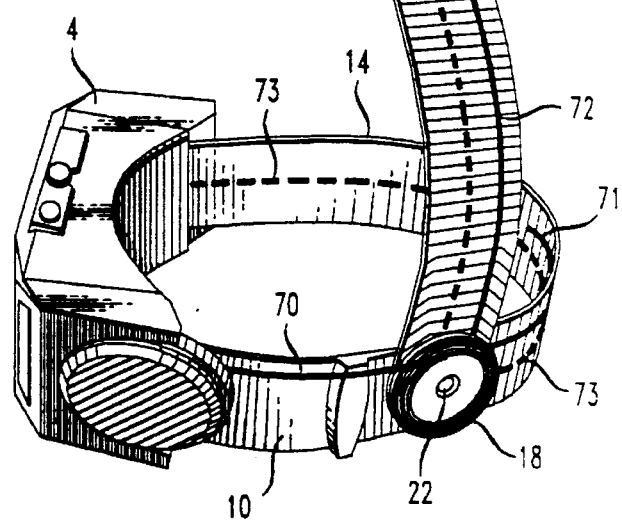
FIG. 7

ON HOOK/OFF HOOK MECHANISM FOR WRIST TELEPHONE

FIELD OF THE INVENTION

This invention relates to a portable radiotelephone device in the form of a wrist device.

BACKGROUND OF THE INVENTION

Recent progress in microelectronics has greatly miniaturized radio communication devices such as receivers, transmitters and antennas. This miniaturization has permitted the integration of these components into wrist-carried radio devices.

Such a portable wrist radiotelephone device is disclosed in U.S. Pat. No. 5,239,521 issued Aug. 24, 1993 to Blonder. The disclosed wrist radiotelephone device comprises a case having a display, and a strap having a top layer and a bottom layer. The top layer includes a releasable end which allows the top layer to separate from the bottom layer in the area where one end of the strap is attached to the case. The top layer of the strap remains attached to the bottom layer via a hinge which also permits the top layer to route. Embedded within the strap are a microphone and a speaker which are connected via conductors to a transceiver located in the case. The speaker is located at the releasable end of the top layer of the swap, and the microphone is located at the attached end of the top layer of the strap.

In operation, the released top layer is rotated in such a way that the speaker is located in the palm of the user's hand and the microphone is located along the inside of the user's forearm. The user's arm is raised so that the user's hand is cupped over the user's ear. Sound ports are located on a front side of the speaker facing the user's ear. The user's hand is oriented such that the user's palm containing the speaker is proximate to the user's ear and the microphone is proximate to the user's mouth. This arrangement allows for the device to be used as a telephone.

SUMMARY OF THE INVENTION

The present invention is directed to an advantageous improvement of such device. In accordance with the present invention, a sensor, illustratively a magnetic switch, is located in the case directly beneath a cradle for receiving the speaker and is capable of detecting when the speaker is removed from, and returned to, the cradle. The radiotelephone switches between on hook and off hook states in response to such detecting.

In an illustrative embodiment, a radiotelephone wrist device comprises a case having a transceiver and a strap attached to the case for fastening the device to a user's wrist. The strap is comprised of a top layer and a bottom layer in which the top layer is releasable from the bottom layer of the strap. A microphone is located on the strap and electrically connected to the transceiver. A speaker is located at an end of the top layer of the strap and electrically connected to the transceiver. A cradle is located on the bottom layer for receiving the speaker. A sensing means located beneath the cradle detects when the speaker is removed from the cradle.

BRIEF DESCRIPTION OF THE DRAWINGS

FIG. 5 is a perspective, partially cutaway view of the wrist telephone which depicts an on hook/off hook mechanism and a speaker housing.

FIG. 6 is a schematic diagram illustrating the electrical functionality of the on hook/off hook mechanism of FIG. 5.

FIG. 7 is a perspective view of the wrist telephone device showing an antenna, exhibiting diversity, embedded within the strap of the device.

DETAILED DESCRIPTION

Figure 1:
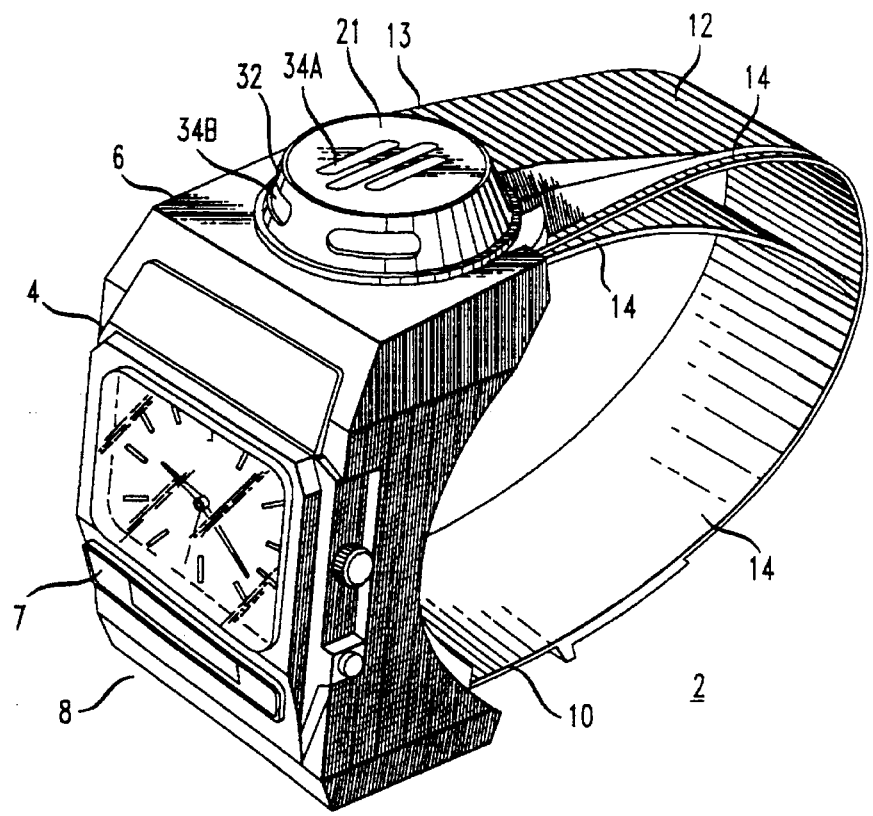
FIG. 1 is a front perspective view of a wrist telephone device in accordance with the invention.
Figure 2:
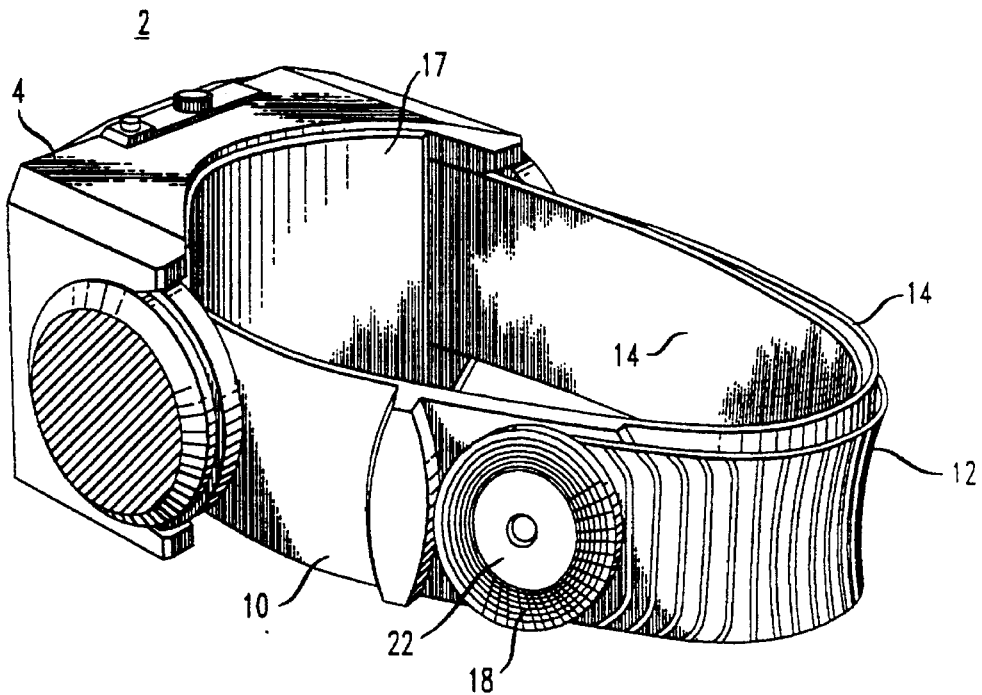
FIG. 2 is a side perspective view of the wrist telephone device of FIG. 1.

Referring to the drawings, FIGS. 1 and 2 show a wrist radiotelephone 2. The telephone 2 is comprised of two main parts, a telephone case 4, and a multilayer strap or band 10. The strap 10 is attached to the case 4 and holds the case 4 onto the wrist of a user. The case 4 contains a miniaturized transceiver (not shown) designed to provide two-way mobile telephone communications, a means for initiating a telephone call with a keypad or voice recognition device (not shown), a display 7 and a power supply such as a battery (not shown). Timekeeping, alarm or pager circuitry can also be incorporated into the case 4.

The case 4 is attached to the band by any number of ways. The two most preferable ways are mounting the case 4 onto the strap 10 or fastening the strap 10 to the upper and lower sides 6 and 8 of the case 4. A clasping means 17, illustratively a sleeve integrally connected to the underside of the case 4, receives the strap 10 and enables the size of the strap 10 to be adjusted so that the device 2 fits over a user's hand and can be fastened to a user's wrist. A safety strap (not shown) can also be attached to the case 4 and strap 10 to help prevent loss of the device 2. The strap 10 has a least two layers, a top layer 12 which is the outer layer and a bottom layer 14 which is in contact with a user's wrist.

Figure 4:
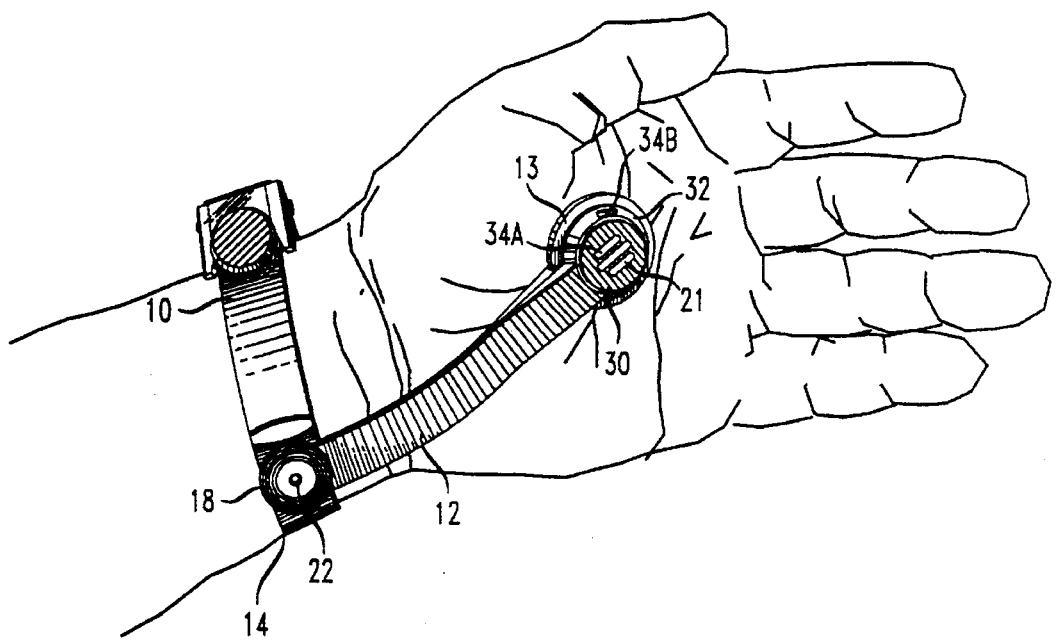
FIG. 4 is a simplified drawing of the wrist telephone device of FIG. 1 as it is worn on a user's wrist.
Figure 11:
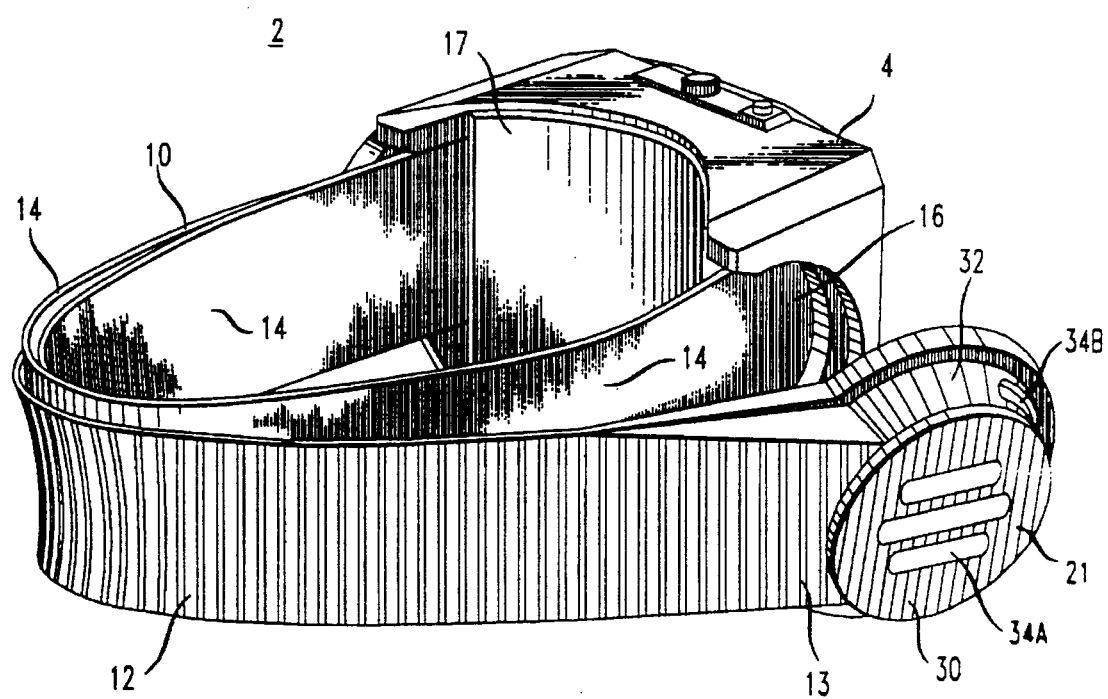
FIG. 11 is a side perspective view of the wrist telephone of FIG. 1 with the top layer of the strap in the released position.

FIG. 11 shows a cradle 16 contained in the bottom layer 14 of the strap 10 and proximate to the case 4. Cradle 16 receives a first end 13 of the top layer 12 of the strap 10. The top layer 12 is detachable from the bottom layer 14 in the area of the strap 10 that is in close proximity to the upper side 6 or lower side 8 of the case 4 by removing the first end 13 of the top layer 12 from the cradle 16. The top layer 12 remains attached to the bottom layer 14 via a pivotable hinge 18 which is illustratively located opposite the case 4. When the top layer 12 is released, the pivotable hinge 18 permits the top layer 12 to rotate approximately ±90° for left or fight hand use. Rotation of the top layer 12 is typically towards the user's hand so that the released top layer 12 is perpendicular to bottom layer 14 and located in the palm of the user's hand, as shown in FIG. 4.

As shown in FIGS. 1–5, 7 and 11, the speaker 20 is located on the first end 13 of the top layer 12. The speaker housing 21 includes sound ports 34a on a front side 30 of the housing 21 and, in accordance with the invention, at least one sound port 34b located on an edge surface 32 of the housing 21. The microphone 22 is located either on the top surface of the bottom layer 14 in close proximity to the hinge 18 or on the top layer 12 incorporated into the hinge 18. Rotation of the top layer 12 places the speaker 20 in the palm of the user's hand and leaves the microphone positioned along the inside of the user's forearm. The speaker 20 and microphone 22 are connected to the transceiver via separate pairs of conductors 73 indicated in FIG. 7 embedded in the strap 10.

When the top layer 12 is released and rotated, the device 2 is in the open position which causes the device 2 to be "off hook", for placing or receiving a call. In preferred embodiments of the invention, as illustrated in FIGS. 5 and 6, a sensing means, such as a magnetic reed switch 36, can be placed in the case 4 directly beneath the speaker cradle 16. The magnetic reed switch 36 includes contacts 40 which are responsive to a mechanism, such as a magnet, associated with the housing 21. The magnet can be separate from the speaker 20, or if the speaker 20 has magnetic qualities, such as a moving coil speaker, the speaker acts as the magnet. In the embodiment of FIG. 5, the speaker includes a moving coil and a magnet 38. The magnetic reed switch 36 is capable of sensing the proximity of the magnet 38. When the speaker is proximate to the reed switch 36, leakage flux from the speaker creates a magnetic field which forces the reed switch contacts 40 apart, thereby causing the device to be "on hook". When the speaker 20 is removed from the cradle 16, the contacts 40 close, thereby causing the device to automatically be off hook. Other types of sensors can be used to control the on hook/off hook condition such as, but not limited to, an optical switch, a capacitive sensor, a Hall effect sensor or a mechanical sensor.

However, use of a magnetic sensing means is particularly advantageous since the magnetic switch 36 has low resistive properties. The magnetic switch is a passive device which does not require any power from the transceiver and does not generate interference to the reception of radio frequency signals. In addition, the hermetic arrangement of the magnetic switch within the cradle reduces the risk of contamination or corrosion.

When a user wishes to place a call, the speaker 20 is released and rotated and placed in the palm of the user's hand. The user then places the palm of his or her hand over his or her ear to use the device 2. Placing the speaker 20 in the palm of the user's hand and the microphone 22 along the inside of the user's forearm and proximate to the user's mouth creates a private environment in which the user can have a conversation. Furthermore, the existence of the edge surface sound ports 34b advantageously allows the user to hear the calling party speaking even if the front sound ports 34a are partially or completely blocked. Such a condition may exist if the user relaxes his or her hand, thereby allowing the speaker 20 to rest on his or her cheek. Such a condition may also exist if the user has a large hand, thereby causing the speaker 20 to rest uncomfortably in his palm.

Figure 3:
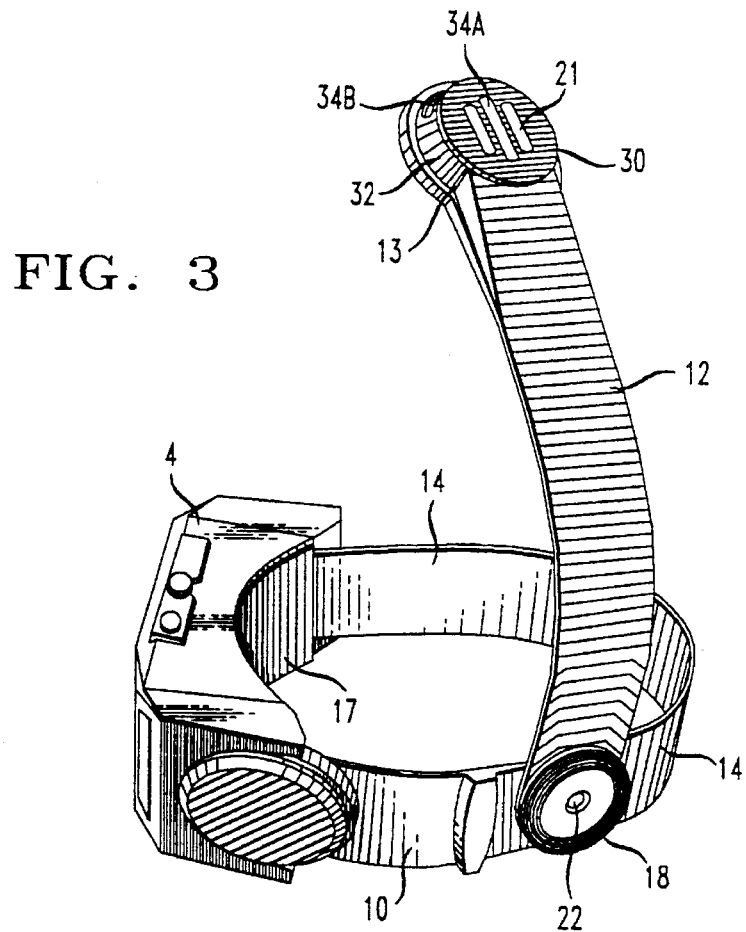
FIG. 3 is a perspective view of the wrist telephone device with the top layer of the strap in the released and open position.

Advantageously, the device 2 does not have to be removed from the user's wrist to be used and the user's shirt or coat cuff does not interfere with rotation of layer 12. FIGS. 3 and 4 show the telephone device 2 before the hand and speaker 20 are brought to cover the user's ear. When the first end 13 of the top layer 12 is placed in the cradle 16, shown in FIG. 11, the device 2 is in closed position and is "on hook". In the closed position the device can be used as a watch, alarm, pager or bracelet. In this mode the speaker 20 can be used to provide a telephone ringing signal, time of day alarm, or the device can be programmed to receive and send paging signals.

In an alternate design of the radiotelephone device 2 in which the present invention may be included, the case 4 is placed in a nonstandard position along the forward side of the user's wrist, rather than the flat portion of the user's wrist, as shown in FIG. 4. To increase the comfort of this nonstandard position of the case 4, the bottom of the case 4 has the shape of a saddle, which fits around the forward side of the user's wrist. Additionally, this nonstandard position of the case 4 places the display 7 in a position which is easier for the user to see and keeps the face of the case from scratching.

The strap 10 is made of materials that are relatively stiff so that when the top layer 12 of the strap 10 is released and rotated, the top layer 12 will remain in an "upright" position. At the same time, the top layer 12 must be flexible and deformable enough to be attached around a wrist. Stiffness may be accomplished by using a spring material for the conductors which are inside the strap or by including a layer of stiff plastic.

In preferred embodiments, each layer 12 and 14 of the strap 10 contains at least one antenna conductor as illustrated in FIG. 7. A first antenna, comprising first and second conductors 70 and 71 respectively, is embedded in the bottom layer 14 of strap 10. A second antenna, comprising a third conductor 72, is embedded in the top layer 12 of the strap 10 so that when the top layer is rotated away from the bottom layer, the first antenna and second antenna are substantially perpendicular to one another and hence substantially uncoupled and independent of one another.

If the antennas are driven with orthogonally independent signals, such a perpendicular arrangement of the antennas provides polarization diversity. The combination of the perpendicular orientation of the antennas and the orthogonal signals used to drive the antennas renders the arrangement essentially insensitive to orientation, thus improving transmission and reception. As a result, the position of the radiotelephone will not greatly impact signal transmission or reception. Such independent signals may comprise time separated signals, frequency separated signals or signals of the same frequency but quadrature in phase. For example, if one antenna loses reception of the signals, the other antenna may retain reception of the signals so that the user has uninterrupted communication ability.

In an alternative embodiment, one antenna may be used for transmitting and the other, because it is essentially uncoupled from the first one, may be used for receiving.

Figure 8:
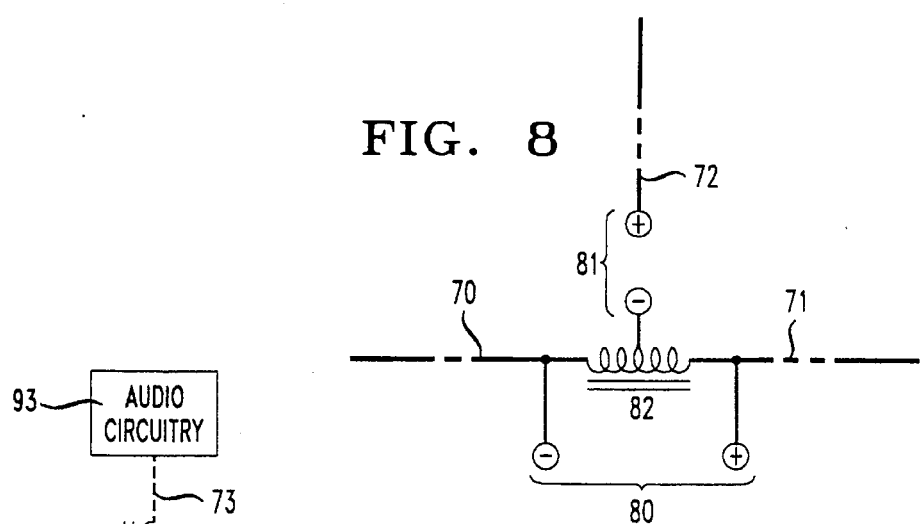
FIGS. 8 and 9 are schematic diagrams of the antenna structure of FIG. 7.

In FIG. 8, centertapped inductor 82, connected between antenna conductors 70 and 71, behaves like a high impedance circuit to differential mode excitation and like a short circuit to common mode excitation. In common mode excitation, inductor 82 bridges antenna conductors 70 and 71, so that they serve as a continuous ground plane onto which antenna conductor 72 may be imaged. The first antenna, comprising dipole-arranged conductors 70 and 71, is driven differentially at terminal pair 80. The second antenna, comprising antenna conductor 72 and the ground plane formed by the inductor 82 bridging antenna conductors 70 and 71, is driven at terminal pair 81, located between conductor 72 and the centertap of inductor 82.

Figure 9:
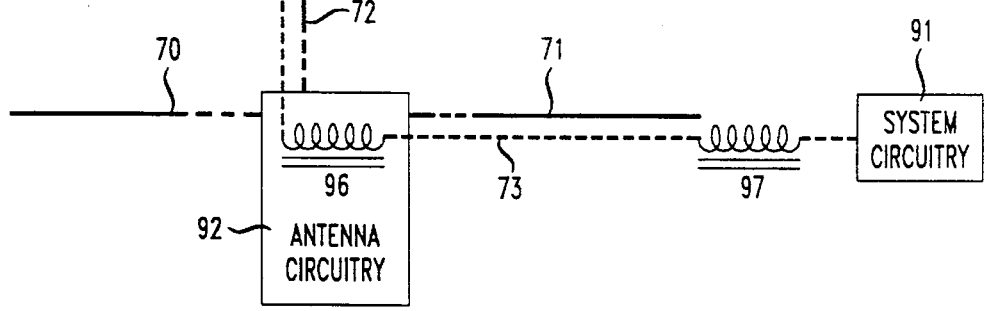

In FIGS. 7 and 9, dashed line 73 indicates an interconnecting bundle of plural conductors, embedded in strap 10, for the purpose of delivering power to and signals between circuit blocks 91, 92 and 93, which are located in case 4, hinge 18 and first end 13 of the top layer 12 respectively. Antenna circuitry 92 may comprise either passive signal splitting and conditioning networks or direct drive, active radio frequency (RF) generating circuits for driving the antenna conductors 70, 71 and 72. Multi-filar inductors 95, 96 and 97, also embedded in strap 10, provide RF isolation of the segments of conductor bundle 73 that run in close proximity to and couple strongly to antenna conductors 70, 71 and 72. Alternatively, the isolated segments of conductor bundle 73 may be used in lieu of conductors 71 and 72.

Figure 10:
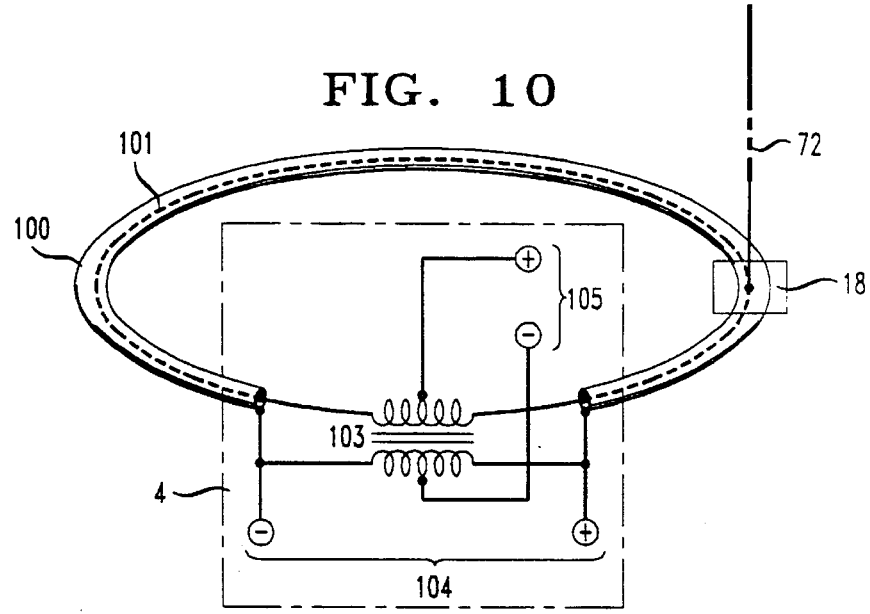
FIG. 10 is a schematic diagram of an alternate embodiment of the antenna structure of FIGS. 8 and 9.

In an alternative embodiment, FIG. 10 shows schematically an antenna conductor comprising a loop of transmission line 100, embedded in lower layer 14 of band 10, (not shown) and terminated at both ends onto centertapped, bi-filar wound inductor 103 inside case 4, represented here by a rectangle 4. The outer conductor of transmission line 100 functions as a first, loop antenna. Access to the outer conductor of the transmission line 100 is gained by driving into terminal pair 104 at the ends of transmission line 100.

Antenna conductor 72, embedded in upper layer 12 of strap 10, is connected to a tap in the inner conductor 101 of transmission line 100, part way around strap 10 at pivotable hinge 18 indicated here by a rectangle 18. Antenna conductor 72 is essentially perpendicular to the plane of the loop antenna formed by transmission line 100 when the top layer 12 of the strap is rotated away from the bottom layer. As in the arrangement of FIG. 8, the outer conductor of transmission line 100 serves as a ground plane onto which antenna conductor 72 may be imaged. The second antenna comprising conductor 72 is accessed by driving terminal pair 105 at the centertaps of bi-filar wound inductor 103. Inductor 103 functions in essentially the same way as inductor 82 in the arrangement of FIG. 8. In this way, the first, loop antenna is driven in common mode, leaving it essentially unexcited and thus substantially independent of the second antenna.

Although the present invention has been described in connection with: radio frequency, it is to be understood that the radio telephone device is equally useful with infrared and other transmission facilities. Applications and modifications which may be devised by those skilled in the art are included within the scope and spirit of this invention.

We claim:

1. A radiotelephone device comprising:

a case having a transceiver;

a strap attached to the case for fastening the device to a user's wrist, said strap having a top layer and a bottom layer, said top layer being releasable from the bottom layer;

a microphone located on the strap and electrically connected to the transceiver;

a speaker located on the top layer of the strap and electrically connected to the transceiver, said speaker having magnetic qualities;

a cradle formed in the case for receiving the speaker; and sensing means located proximate to the cradle for sensing the presence of magnetic fields created by leakage flux from the speaker.

2. The device according to claim 1 wherein the radiotelephone device enters an on hook state when the speaker is placed in the cradle.

3. The device according to claim 1 wherein the radiotelephone device enters an on hook state when the sensing means senses the presence of magnetic fields created by leakage flux from the speaker.

4. The device according to claim 1 wherein the radiotelephone device enters an off hook state when the speaker is removed from the cradle.

5. The device according to claim 1 wherein the radiotelephone device enters an off hook state when the sensing means senses the absence of magnetic fields created by leakage flux from the speaker.

6. The device according to claim 1 wherein said sensing means is a magnetic reed switch.

7. The device according to claim 1 wherein the radiotelephone device enters a first state when the speaker is placed in the cradle.

8. The device according to claim 7 wherein said radiotelephone device enters a second state when the speaker is removed from the cradle.

9. The device according to claim 1 wherein said radiotelephone device enters a first state when the sensing means senses the presence of magnetic fields created by leakage flux from the speaker.

10. The device according to claim 9 wherein said radiotelephone device enters a second state when the sensing means senses the absence of magnetic fields created by leakage flux from the speaker.

11. The device according to claims 7 or 9 wherein said first state is an on hook state.

12. The device according to claims 8 or 10 wherein said second state is an off hook state.

13. A radiotelephone device comprising:

radiotelephone transceiver circuitry;

a strap for fastening the device to a user's wrist;

a speaker electrically connected to said radiotelephone transceiver circuitry, said speaker having magnetic qualities;

a cradle for said speaker; and sensing means for sensing the presence of magnetic fields created by leakage flux from said speaker in said cradle and its absence therefrom;

said circuitry placing said radiotelephone device in an on hook state when said sensing means senses the presence of said magnetic fields created by leakage flux from said speaker in said cradle, and placing said radiotelephone device in an off hook state when said sensing means senses the absence of said magnetic fields created by leakage flux from said speaker from said cradle.

* * * * *